(12) United States Patent
Zoltan et al.

(10) Patent No.: US 10,413,081 B2
(45) Date of Patent: Sep. 17, 2019

(54) SYNTHETIC OR NATURAL FIBER MATTRESS WITH ENHANCED COMPRESSION RESISTANCE

(71) Applicant: Therapedic of New England, Brockton, MA (US)

(72) Inventors: Alvin Zoltan, Montreal (CA); Mark Savel, Sudbury, MA (US); Mark Corvese, Raynham, MA (US)

(73) Assignee: Therapedic of New England, LLC, Brockton, MA (US)

( * ) Notice: Subject to any disclaimer, the term of this patent is extended or adjusted under 35 U.S.C. 154(b) by 543 days.

(21) Appl. No.: 15/165,266

(22) Filed: May 26, 2016

(65) Prior Publication Data

US 2016/0345745 A1    Dec. 1, 2016

Related U.S. Application Data

(60) Provisional application No. 62/168,290, filed on May 29, 2015.

(51) Int. Cl.

| A47C 27/12 | (2006.01) |
|---|---|
| B29C 43/00 | (2006.01) |
| A47C 27/04 | (2006.01) |
| A47C 27/06 | (2006.01) |
| A47C 27/20 | (2006.01) |
| D04H 1/558 | (2012.01) |
| D04H 1/559 | (2012.01) |

(Continued)

(52) U.S. Cl.
CPC ............ *A47C 27/122* (2013.01); *A47C 27/04* (2013.01); *A47C 27/06* (2013.01); *A47C 27/127* (2013.01); *A47C 27/20* (2013.01); *B29C 43/003* (2013.01); *D04H 1/558* (2013.01); *D04H 1/559* (2013.01); *B29K 2067/003* (2013.01); *B29L 2031/751* (2013.01)

(58) Field of Classification Search
CPC .......... D04H 1/54; D04H 1/558; D04H 1/559; B29L 2031/751; A47C 27/122; A47C 27/04; A47C 27/06
See application file for complete search history.

(56) References Cited

U.S. PATENT DOCUMENTS

| 4,753,693 A | 6/1988 | Street |
| 5,327,596 A | 7/1994 | Wallace et al. |

(Continued)

*Primary Examiner* — Scott W Dodds
(74) *Attorney, Agent, or Firm* — Burns & Levinson, LLP; Joseph M. Maraia

(57) ABSTRACT

A structured fiber product is constructed with fibers oriented primarily in a vertical direction. Fibers made from recycled materials are combined with binder fibers which have a lower transition temperature than the recycled fibers. A three dimensional web is formed from the fibers oriented in a horizontal direction. The web is heated to bind the fibers and cooled to fix the web in a predetermined thickness. Sections of the web are stacked while maintaining substantially parallel orientation of the fibers in the horizontal direction, heated to bind the fibers and cooled to fix a predetermined thickness of the structured fiber product. The structured fiber product is rotated so that the fibers are oriented in the vertical direction. One or more slabs of the structured fiber product with vertically oriented fibers may be configured to form a resilient structure such as a mattress core.

12 Claims, 5 Drawing Sheets

(51) Int. Cl.
*B29K 67/00* (2006.01)
*B29L 31/00* (2006.01)

(56) References Cited

U.S. PATENT DOCUMENTS

| | | |
|---|---|---|
| 6,077,378 A | 6/2000 | Bullard et al. |
| 2010/0029163 A1 | 2/2010 | Ogle et al. |
| 2013/0269154 A1* | 10/2013 | Kuhl .................. D04H 1/559 19/106 R |
| 2014/0053341 A1 | 2/2014 | Parvin |

* cited by examiner

SYNTHETIC OR NATURAL FIBER MATTRESS WITH ENHANCED COMPRESSION RESISTANCE

CROSS REFERENCE TO RELATED APPLICATIONS

This application claims priority to U.S. Provisional Patent Application No. 62/168,290 entitled Synthetic or natural fiber mattress with enhanced compression resistance which was filed on May 29, 2015 and which is incorporated herein by reference in its entirety.

FIELD OF TECHNOLOGY

The present disclosure relates to a resilient structure such as a mattress, and more particularly to a method of manufacturing a fiber mattress with substantial compression resistance.

BACKGROUND

Resilient structures for mattress cores are commonly constructed using various configurations of padded coil springs and/or synthetic foam materials, for example. Resilient structures such as batts made from synthetic fibers have been used as low cost alternatives to coil spring and foam structures in mattress cores and furniture upholstery. However synthetic fibers such as nylon and polyester have tendency to rebound to an original shape after compression due to inherent plastic memory in the fibers. Restraining the compressed fiber structure in a container such as mattress cover has resulted in unevenness and eventual deterioration of the resilient structure.

Various techniques have been used to overcome the plastic memory of synthetic fibers to construct a batt having a desired density. For example, U.S. Pat. No. 4,753,673 entitled Method for Forming a Vacuum Bonded Non-Woven Batt describes forming a vacuum bonded non-woven batt by blending multiple polymer fibers in which on type of fiber has a relatively low melting temperature and another type of fiber has a relatively high melting temperature. The blended fibers are formed into a thick web or a multi-layered web which is then compressed by vacuum while applying heat to release the plastic memory of the lower melting temperature fiber. This fuses the two types of fibers to form a relatively high density resilient batt having interconnected fused fibers. However, the previously known resilient structures made from fiber batts have not provided a desired degree compression resistance, comfort, durability.

Resilient structures made from blended fibers have been enhanced to increase resiliency in strategic locations by imbedding coil springs in the fiber matt. For example, U.S. Pat. No. 6,077,378 entitled Method of Forming Densified Fiber Batt with Coil Springs Interlocked Therein describes a densified fiber batt core including low melt fibers which when heated to the melting point and then cooled, intersect and interlock with coil springs. The coil springs function as an integral part of the fiber batt. However, portions of the fiber batt that lack imbedded coil springs may lack compression resistance or resiliency. Moreover, differences between the compressibility of fiber portions and spring portions of the structure may cause the springs to become unlinked from the fibers and cause premature deterioration of the structure.

SUMMARY

Aspects of the present disclosure include a structured fiber product that is constructed with fibers oriented primarily in a vertical direction. The vertical orientation of the fibers provides a desired degree compression resistance, resiliency comfort and durability. Segments of the structured fiber product with different densities can be arranged to form a mattress core with different compression resistance in different areas of the mattress. Coil spring segments may be arranged in combination with segments of the structured fiber product to provide flexibility in designing a mattress core.

According to an aspect of the present disclosure. Fibers made from recycled materials are combined with binder fibers which have a lower transition temperature than the recycled fibers. A three dimensional web is formed from the fibers which are oriented in a horizontal direction. The web is heated to bind the fibers and cooled to fix the web in a predetermined thickness. Sections of the web are stacked while maintaining substantially parallel orientation of the fibers in the horizontal direction, heated to bind the fibers and cooled to fix a predetermined thickness of the structured fiber product.

The structured fiber product is rotated, or cut into segments and then rotated, so that the fibers are oriented in the vertical direction. One or more slabs of the structured fiber product with vertically oriented fibers may arranged together and attached together using adhesives, for example, to form a resilient structure such as a mattress core.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings, which are not necessarily to scale, emphasis illustrative embodiments of the present disclosure.

DETAILED DESCRIPTION

Figure 1:
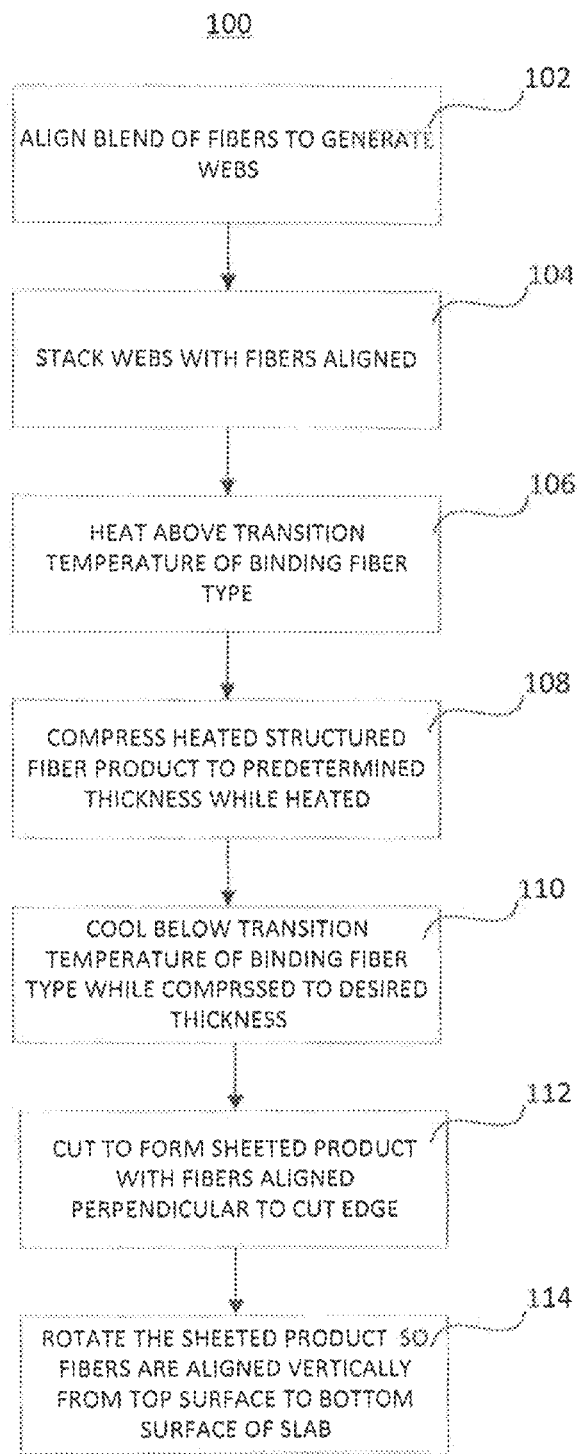
FIG. 1 is a process flow diagram illustrating a method for constructing a structured fiber product according to an aspect of the present disclosure.

Aspects of the present disclosure include a segmented mattress with higher compression resistance than previously known fiber core mattresses. In an illustrative embodiment of the disclosed process, a mattress core can be produced with 85% to 90% recycled fibers. The process includes the blending a matrix of fibers with a thermoplastic binder fiber. A thermoplastic binder fiber is a fiber which will activate as a binder fiber at a process air temperature below that of the matrix fiber and be of compatible material content as to act as a binding agent once set.

In one example implementation of the disclosed process, 80% by weight regenerated fibers are derived from polyethylene terephthalate (PET) water bottles and food containers.

Collected bottles and food containers are sorted by color, clarity and or type of plastic, washed and dried.

The bottles and containers are shredded into flakes which may optionally remain sorted by color or clarity, for example. The flakes go through a bath which separates the PET flakes from different plastics based on differing floatation of the flakes. In an illustrative implementation, only the clear flakes are used. The sorted PET clear flakes are then washed in a hot wash process to remove labels and rinsed.

The flakes are then dried to remove water content. The dried flakes are then extruded into filaments and finished into heat set fibers. During the extrusion process, an extruder compacts and heats the flakes until they melt. The melted material is forced through a fine mesh opening called a spinneret and drawn out at a desired thickness. The extruded plastic is then heat set in a monofilament form, crimped and cut into different lengths depending on the product application.

The heat set fibers are then teased open and homogeneously mixed with PET binder fiber. The PET binder fibers are also teased open prior to mixing with the recycled PET fibers. The PET binder fibers have a lower melting point than the extruded recycled PET fibers and provide good adhesion to recycled PET fibers. In an illustrative embodiment the mixture includes 20% PET binder fiber by weight.

The blended fibers form tufts, which are then carded to make the individual fibers straight and parallel. The straight and parallel fibers are either mechanically or pneumatically collected and released.

The parallel fibers form a substantially horizontal web with fibers laid horizontally, which is then thickened in the vertical direction by blowing air into the web or through mechanical doffing, for example, to generate a three dimensional web construction. Hot air is applied to the web to activate the binder fibers and cause them to flow to intersections of the fibers in the web while the web reaches a desired thickness. When the web reaches the desired thickness it is quenched with cold air.

Multiple sections of the three dimensional web are then stacked into multiple layers with each overlapping layer slightly offset from adjacent layers to reach a desired weight and height. The fibers remain arranged horizontally, i.e., in the cross machine direction in the case of cross lapping (90 degree lapping) or in the machine direction in the case of straight-out lapping. The stack may be built up by winding up on belts or rollers ideally with oscillation to achieve the offset, for example. This forms a structured fiber product in which the fibers remain oriented primarily in the horizontal direction.

The structured fiber product is then subjected to heat activation at sufficient temperature to activate the binder fibers but below that of the transition point of the matrix fibers in an oven with flow through design. The product is gradually compacted by use of perforated belting, for example, to bring the structured fiber product to a finished thickness then set with cold air at the finished thickness and released.

The product is sheeted and cut into sections at 90 degrees counter to the fiber orientation. The segments are rotated 90 degrees for assembly so the fibers are oriented vertically. The resulting structure has fibers primarily oriented in the vertical direction. This provides increased compression resistance in the vertical direction and excellent stability in other directions.

In one example, a 150 mm thick structured fiber product is produced with a density of 3.5 kilograms per square meter. The product segments can be produced in different densities for positioning into the assembled core structure as required to get the required comfort profile. In an illustrative embodiment, the segments are arranged in a manner to achieve the best comfort profile. The segments are then attached to each other using adhesives, for example. The resulting mattress core has minimal flexing as compared with other methods.

Referring to FIG. 1, one aspect of the present disclosure includes a method 100 of forming a resilient structure. At block 102, the method 100 includes aligning a blend of fibers comprising a first fiber type and a second fiber type to generate a plurality of webs of aligned fibers, wherein the first fiber type has a lower transition temperature than the second fiber type. The aligned fibers are aligned in the parallel with the web.

At block 104, the method includes stacking the webs of aligned fibers to generate a structured fiber product, wherein the stacking maintains alignment of the aligned fibers among the plurality of webs. At block 106, the method includes heating the structured fiber product to a temperature above a transition temperature of the first fiber type and below a transition temperature of the second fiber type.

At block 108, the method includes compressing the heated structured fiber product to a predetermined thickness while the temperature of the heated structured fiber product is above the transition temperature of the first fiber type and below the transition temperature of the second fiber type. At block 110, the method includes cooling the heated structured fiber product to below the transition temperature of the first fiber type while the heated structured fiber product is compressed to the predetermined thickness to generate a fixed thickness structured fiber product, wherein the fibers are aligned in a direction perpendicular to the thickness of the structured fiber product.

At block 112, the method includes cutting the fixed thickness structured fiber product to form a sheeted product having a cut edge, wherein the fibers are aligned in a direction perpendicular to the cut edge. At block 114, the method includes rotating the sheeted product to form slab having a top surface parallel to the cut edge and a bottom surface parallel to the cut edge, wherein the fibers are aligned in a direction that extends from the bottom edge to the top edge.

According to an aspect of the present disclosure, the method may optionally include die cutting the slab from the front surface to the bottom surface to generate at least one void in the slab and inserting at least one coil spring in each of the voids. The coil springs may include a pre-assembled block of coil springs, and/or as a fabric encased coil springs, for example. The method may include inserting the slab along with the coil spring(s) into a mattress cover and/or covering the slab and the at least one coil spring with a mattress top padding structure.

In another illustrative embodiment, according to an aspect of the present disclosure, the fixed thickness structured fiber product is cut to form a plurality of sheeted products each of which having a cut edge, wherein the fibers are aligned in a direction perpendicular to the cut edge. Each of the sheeted products is rotated to form a plurality of slabs each of which having a top surface parallel to the cut edge and a bottom surface parallel to the cut edge, wherein the fibers are aligned in a direction that extends from the bottom edge to the top edge. The plurality of slabs are arranged against each other to form a mattress core wherein the bottom edges of each of the slabs together form a bottom surface of mattress core and wherein the top edges of each of the slabs together form a top surface of the mattress core.

Adjoining slabs in the mattress core are then attached together, for example, by applying an adhesive between the adjoining slabs in the mattress core. In an illustrative embodiment, the plurality of slabs may be arranged to include one or more voids in the mattress core and at least one coil spring may be inserted in each of the voids. The coil springs may be configured as pre-assembled blocks of coil springs, for example. The mattress core and/or the coil springs may optionally be covered with a mattress top padding structure, and/or may be inserted directly into a mattress cover.

Figure 2:
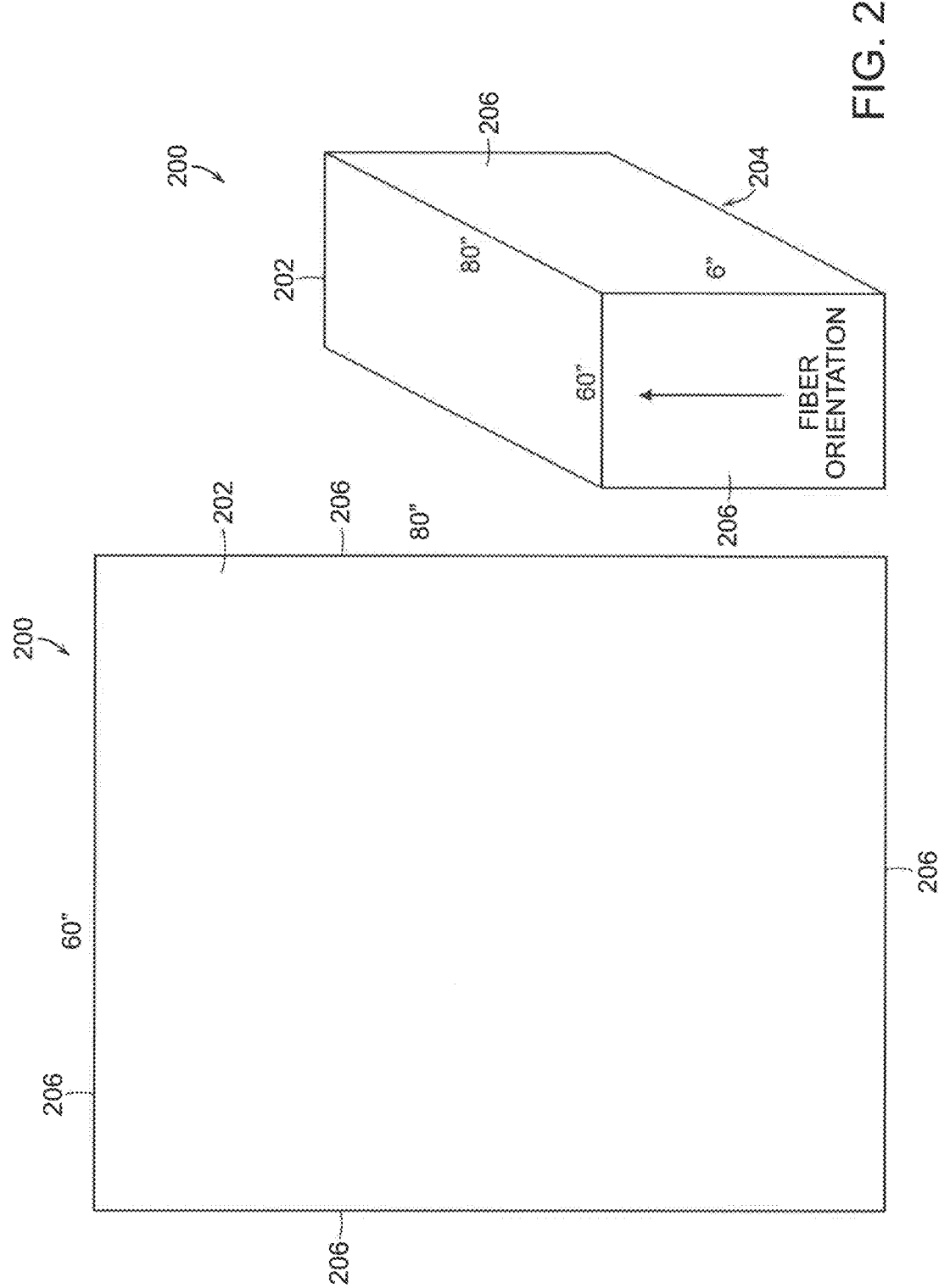
FIG. 2 is a diagram of a mattress core made from a structured fiber product according to an aspect of the present disclosure.

An example of a mattress core that is constructed according to an aspect of the present disclosure is described with reference to FIG. 2. In this example, the mattress core includes a slab 200 of the disclosed structured fiber product. The slab includes a top surface 202, a bottom surface 204 and four walls 206 extending between the top surface 204 and the bottom surface 206. The slab 200 includes a blend of matrix fibers and thermoplastic binder fibers. The fibers are primarily oriented in parallel with a longitudinal axis extending in a direction between the top and bottom surface of the slab. Optionally, the mattress core 200 may include one or more voids extending between the top surface 202 and the bottom surface 204 of the slab 200 and at least one spring installed in each of the voids.

Figure 3:
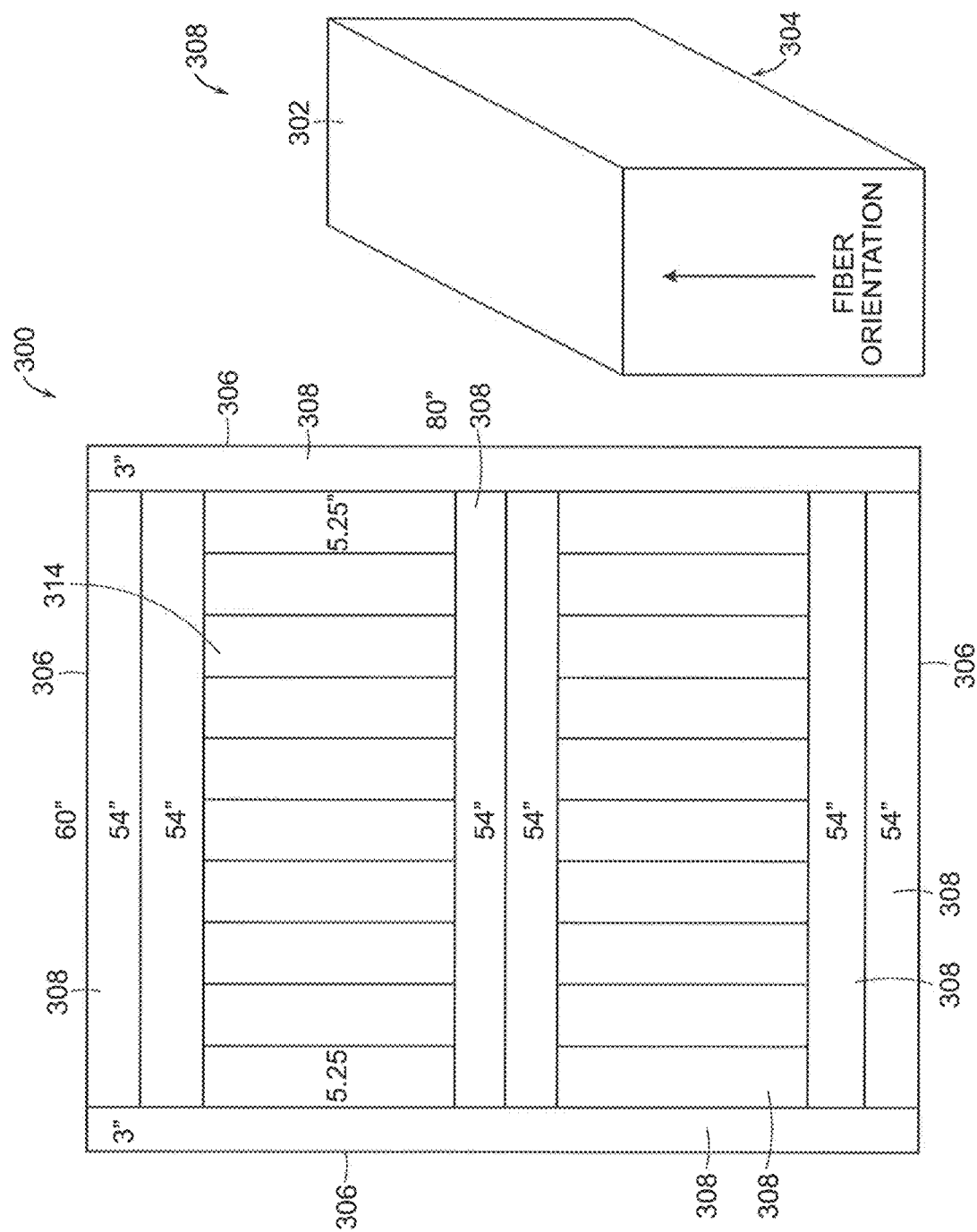
FIG. 3 is a diagram of a mattress core made from a structured fiber product according to another aspect of the present disclosure.

An example of a mattress core that is constructed according to another aspect of the present disclosure is described with reference to FIG. 3. In this example, the mattress core 300 includes a number of segments of the disclosed structured fiber product. The mattress core 300 includes a top surface 302 and a bottom surface 304 and four walls 306 extending between the top surface 302 and the bottom surface 306. The segments 308 are configured between the top surface 302, the bottom surface 304 and the four walls 306, 308, 310, 312. Each segment includes a blend of matrix fibers and thermoplastic binder fibers. The matrix fibers have a melt transition temperature higher than a melt transition temperature of the thermoplastic binder fibers. The fibers have a longitudinal axis extending primarily in a direction between the top and bottom surface.

Figure 4:
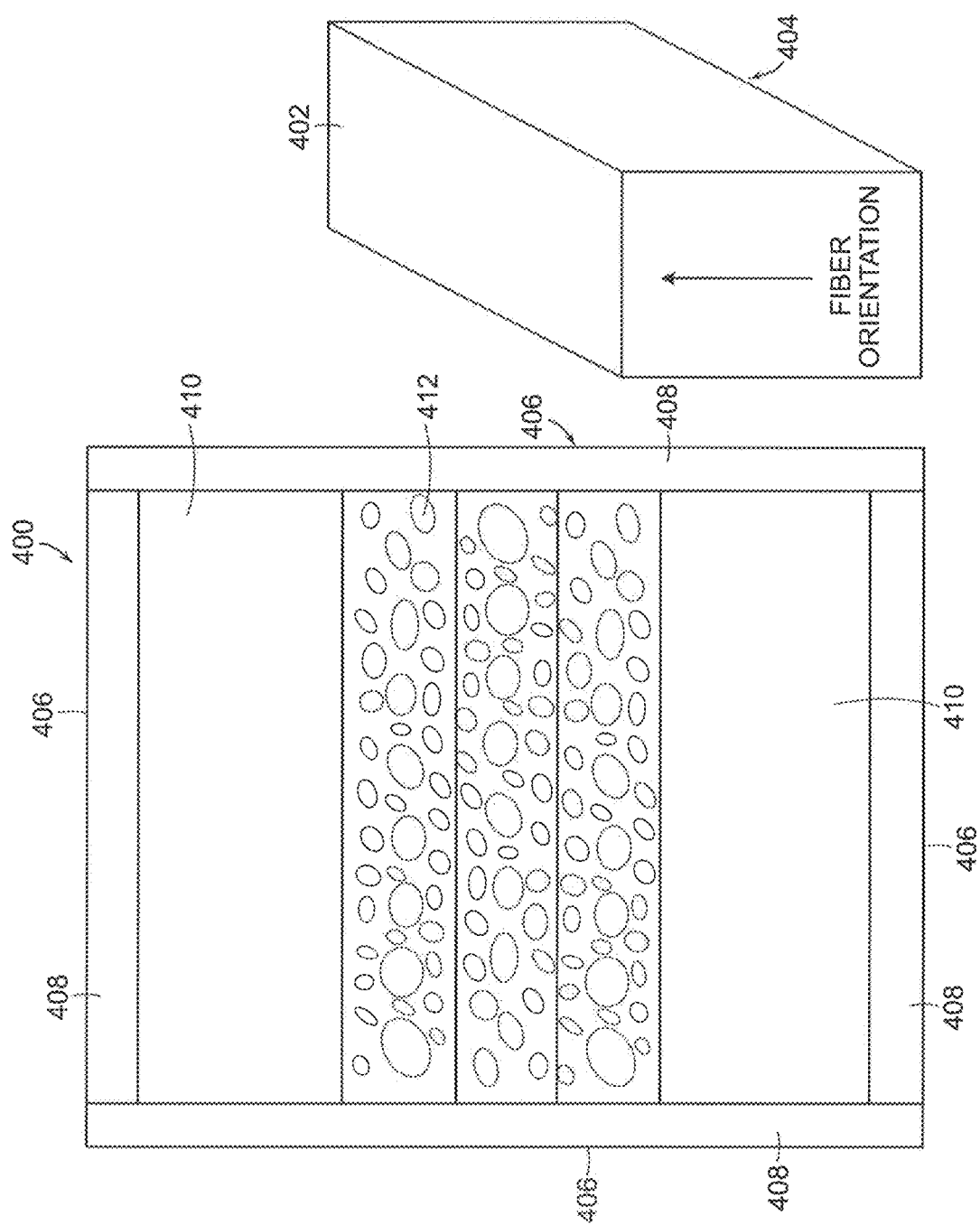
FIG. 4 is a diagram of a mattress core made from a structured fiber product according to another aspect of the present disclosure.

An example of a mattress core that is constructed according to another aspect of the present disclosure is described with reference to FIG. 4. In this example, a mattress core 400 includes a top surface 402 and a bottom surface 404 and four walls 406 extending between the top surface 402 and the bottom surface 404. A number of segments 408, 410 of the disclosed structured fiber product are configured between the top surface 402, the bottom surface 404 and the four walls 406. Each segment 408, 410 includes a blend of matrix fibers and thermoplastic binder fiber. The matrix fibers have a melt transition temperature that is higher than a melt transition temperature of the thermoplastic binder fibers. The fibers have a longitudinal axis extending primarily in a direction between the top and bottom surface.

The product segments can be produced in different densities for positioning into the assembled core structure as required to get the required comfort profile. In an illustrative embodiment, the segments are arranged in a manner to achieve the best comfort profile. For example, edge segments 408 may have a different density than internal segments 410.

In this example, the mattress 400 also includes a number of voids between the top and bottom surface. The voids may be formed by cutting the structured fiber product and/or by omitting selected internal segments of the structured fiber product, for example. The mattress 400 includes at least one spring 412 inserted in each of the voids. The springs 412 may be installed as pre-assembled rows of fabric encased coils for example.

Figure 5:
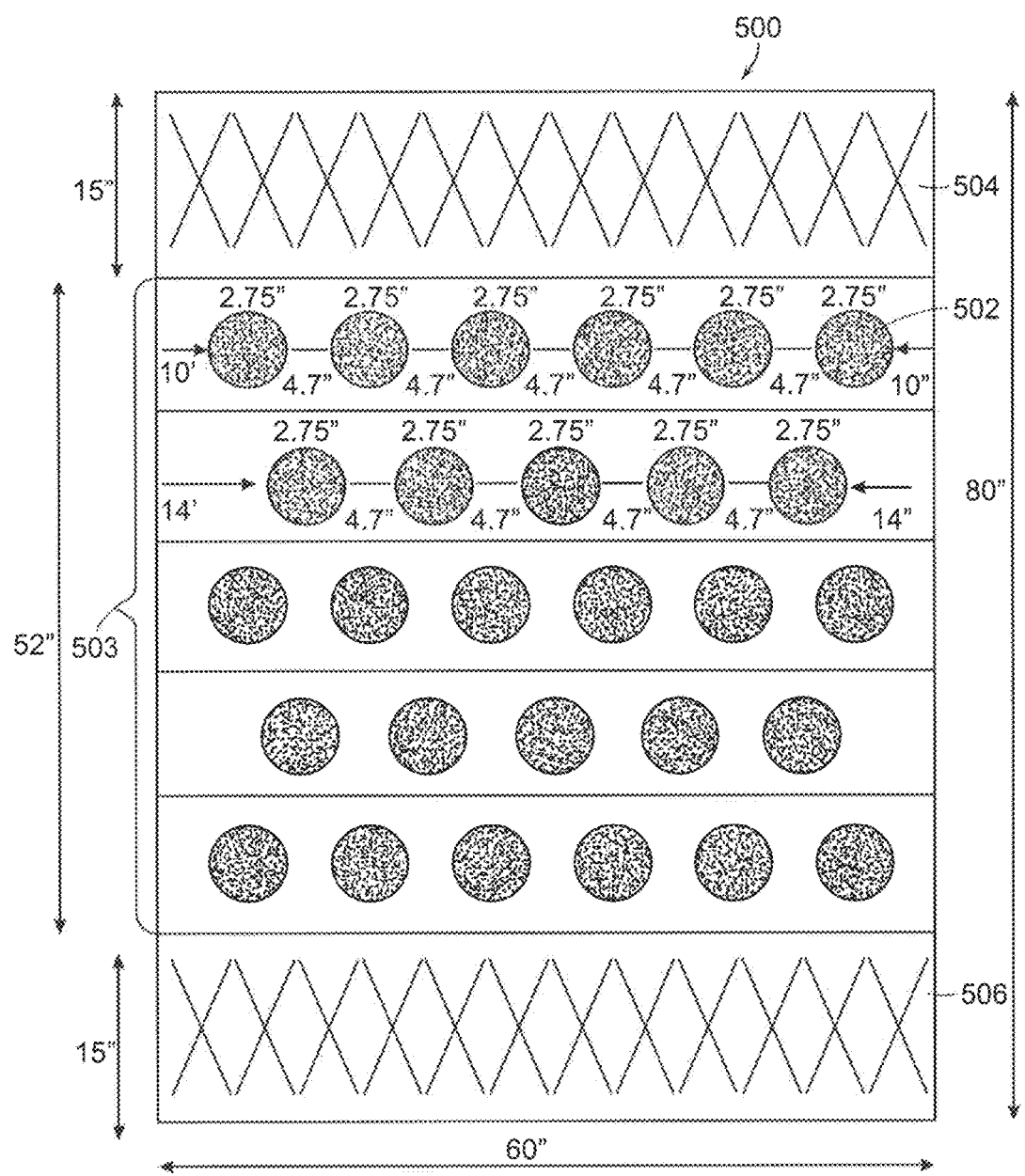
FIG. 5 is a diagram of a mattress core made from a structured fiber product according to another aspect of the present disclosure.

An example of a mattress core that is constructed according to another aspect of the present disclosure is described with reference to FIG. 5. In this example, the mattress core 500 includes a number of rows of springs 502 in a central portion 503. The springs 502 may be assembled together from pre-assembled rows of fabric encased coils for example. The mattress 500 also includes a first segment 504 of the disclosed structured fiber product attached to the central portion 503 to form a head section of the mattress 500 and a second segment 506 of the disclosed structured product attached to the central portion 503 to form a foot section of the mattress.

Although the present disclosure and its advantages have been described in detail, it should be understood that various changes, substitutions and alterations can be made herein without departing from the scope of the disclosure as defined by the appended claims. Moreover, the scope of the present application is not intended to be limited to the particular configurations of the process, machines, manufactures, composition of matter, means methods and/or steps described in the specification. As one of ordinary skill in the art should readily appreciate from the present disclosure, processes, machines, manufactures compositions of matter, means, methods and/or steps presently existing or later to be developed that perform substantially the same function or achieve substantially the same result as the corresponding configurations described herein may be utilized according to the present disclosure. Accordingly, the appended claims are intended to include within their scope such processes, machines, manufactures, compositions of matter, means methods and/or steps.

What is claimed:

1. A method of forming a resilient structure, comprising:

aligning a blend of fibers comprising a first fiber type and a second fiber type to generate a plurality of webs of aligned fibers, the aligned fibers aligned in parallel with the webs, wherein the first fiber type has a lower transition temperature than the second fiber type;

stacking the webs of aligned fibers to generate a structured fiber product, wherein the stacking maintains alignment of the aligned fibers among the plurality of webs;

heating the structured fiber product to a temperature above the transition temperature of the first fiber type and below the transition temperature of the second fiber type;

compressing the heated structured fiber product to a predetermined thickness while the temperature of the heated structured fiber product is above the transition temperature of the first fiber type and below the transition temperature of the second fiber type;

cooling the heated structured fiber product to below the transition temperature of the first fiber type while the heated structured fiber product is compressed to the predetermined thickness to generate a fixed thickness structured fiber product, wherein the fibers are aligned in a direction perpendicular to the thickness of the structured fiber product;

cutting the fixed thickness structured fiber product to form a sheeted product having a cut edge, wherein the fibers are aligned in a direction perpendicular to the cut edge; and rotating the sheeted product to form a slab having a top surface parallel to the cut edge and a bottom surface parallel to the cut edge, wherein the fibers are aligned in a direction that extends from the bottom edge to the top edge;

die cutting the slab from the top surface to the bottom surface to generate at least one void in the slab;

inserting at least one coil spring in each of the voids.

2. The method of claim 1, comprising blending the first fibers with the second fibers to generate the blend of fibers.

3. The method of claim 1, wherein the at least one coil spring comprises a pre-assembled block of coil springs.

4. The method of claim 3, comprising:
inserting the slab along with the coil spring(s) into a mattress cover.

5. The method of claim 3, comprising:
covering the slab and the at least one coil spring with a mattress top padding structure.

6. A method of forming a resilient structure, comprising:
aligning a blend of fibers comprising a first fiber type and a second fiber type to generate a plurality of webs of aligned fibers, the aligned fibers aligned in parallel with the webs, wherein the first fiber type has a lower transition temperature than the second fiber type;

stacking the webs of aligned fibers to generate a structured fiber product, wherein the stacking maintains alignment of the aligned fibers among the plurality of webs;

heating the structured fiber product to a temperature above the transition temperature of the first fiber type and below the transition temperature of the second fiber type;

compressing the heated structured fiber product to a predetermined thickness while the temperature of the heated structured fiber product is above the transition temperature of the first fiber type and below the transition temperature of the second fiber type;

cooling the heated structured fiber product to below the transition temperature of the first fiber type while the heated structured fiber product is compressed to the predetermined thickness to generate a fixed thickness structured fiber product, wherein the fibers are aligned in a direction perpendicular to the thickness of the structured fiber product;

cutting the fixed thickness structured fiber product to form a plurality of sheeted products each of which having a cut edge, wherein the fibers are aligned in a direction perpendicular to the cut edge;

rotating each of the sheeted product to form a plurality of slabs each of which having a top surface parallel to the cut edge and a bottom surface parallel to the cut edge, wherein the fibers are aligned in a direction that extends from the bottom edge to the top edge;

arranging the plurality of slabs against each other to form a mattress core wherein the bottom edges of each of the slabs together form a bottom surface of mattress core and wherein the top edges of each of the slabs together form a top surface of the mattress core; and applying an adhesive between adjoining slabs in the mattress core.

7. The method of claim 6, comprising:
inserting the mattress core into a mattress cover.

8. The method of claim 6 comprising:
arranging the plurality of slabs to include one or more voids in the mattress core;
inserting at least one coil spring in each of the voids.

9. The method of claim 8, comprising:
covering the mattress core and the at least one coil spring with a mattress top padding structure.

10. The method of claim 9, wherein the at least one coil spring comprises a pre-assembled block of coil springs.

11. The method of claim 9 comprising:
inserting the mattress core along with the coil spring(s) into a mattress cover.

12. The method of claim 9, comprising:
covering the mattress core and the at least one coil spring with a mattress top padding structure.

* * * * *